INVENTORS
MAX BALLAS and
MARVIN R. PAINTER

BY
ATTORNEYS

Oct. 1, 1968  M. BALLAS ETAL  3,404,008
APPARATUS AND PROCESS FOR PASTEURIZING EGG PRODUCTS
Filed Oct. 17, 1967  2 Sheets-Sheet 2
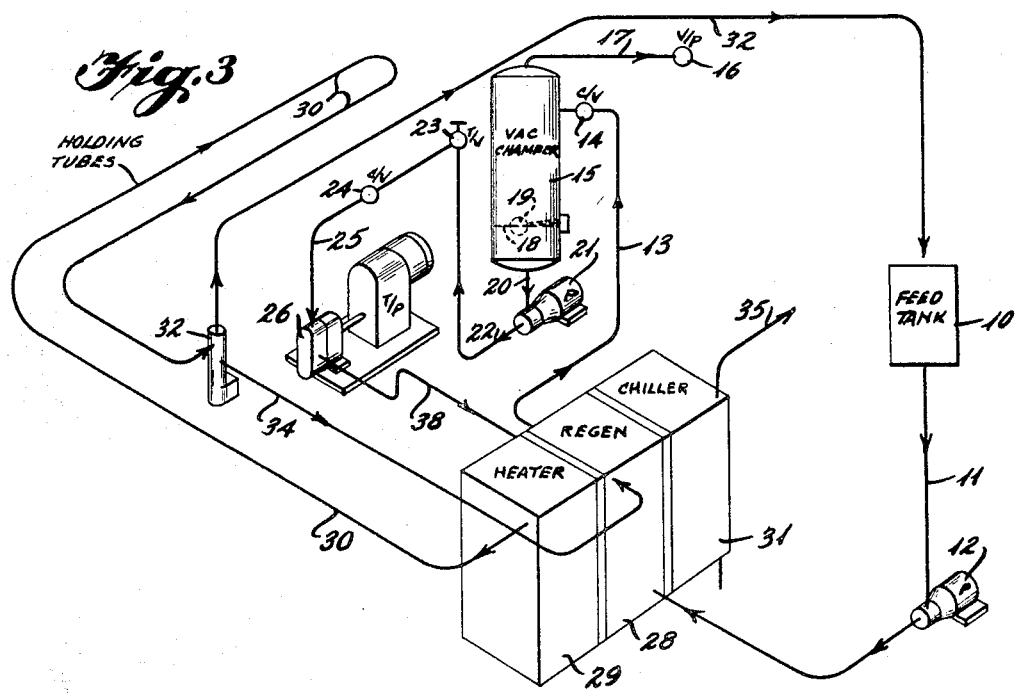
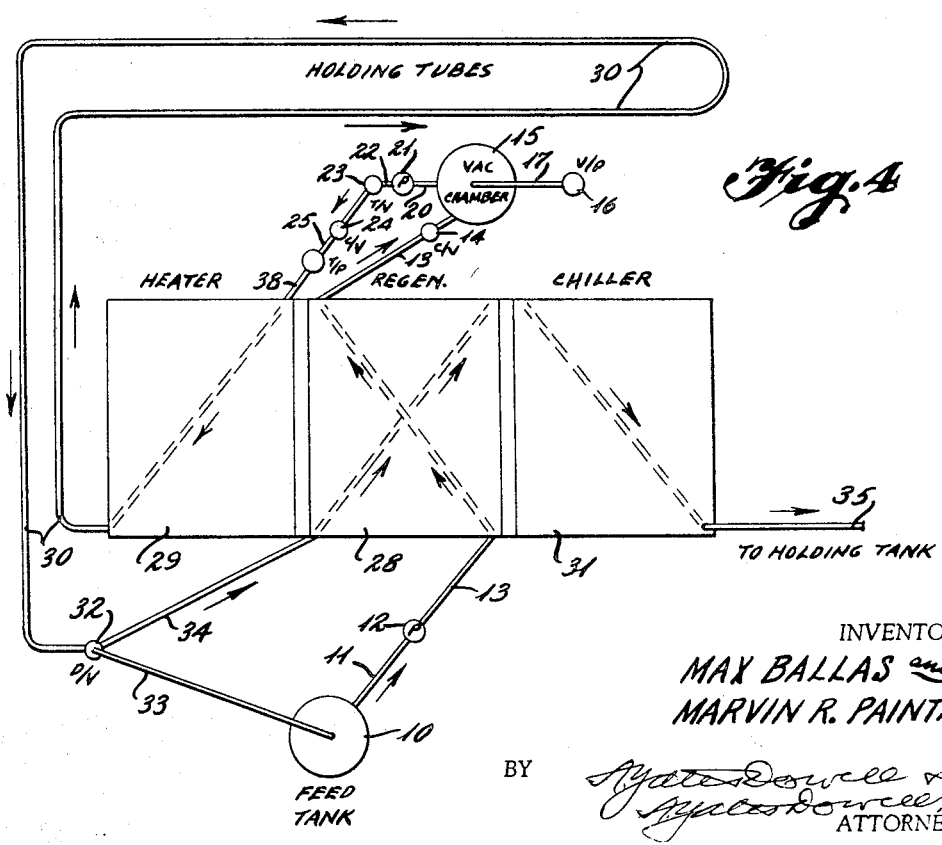
INVENTORS
MAX BALLAS and
MARVIN R. PAINTER
BY
ATTORNEYS

United States Patent Office 3,404,008
Patented Oct. 1, 1968

3,404,008
APPARATUS AND PROCESS FOR PASTEURIZING EGG PRODUCTS
Max Ballas and Marvin R. Painter, Zanesville, Ohio, assignors to Ballas Egg Products Corporation, Zanesville, Ohio
Continuation-in-part of applications Ser. No. 490,262, Sept. 27, 1965, and Ser. No. 573,325, Aug. 18, 1966. This application Oct. 17, 1967, Ser. No. 675,863
16 Claims. (Cl. 99—161)

ABSTRACT OF THE DISCLOSURE

Unstabilized egg product is pasteurized without coagulation by applying vacuum to remove entrapped air prior to heating it to pasteurizing temperature. The pressure is preferably increased after the vacuum treatment so that pressure of the raw product during regenerative heating is below that of the product with which it is in heat exchange relation. Apparatus with control means responsive to the temperature and vacuum are provided.

Figure 1:
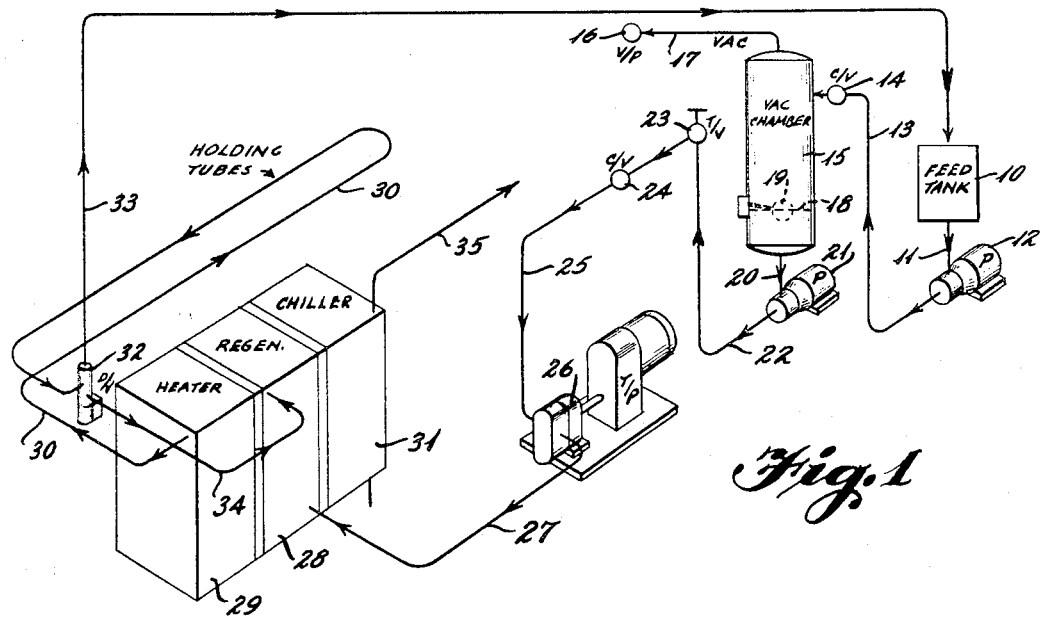

This application is a continuation-in-part of applications Ser. No. 490,262, filed Sept. 27, 1965, and Ser. No. 573,325, filed Aug. 18, 1966 both now abandoned.

---

The invention relates to pasteurization of products consumed by humans and animals and to the method and apparatus employed for such purpose.

The invention relates particularly to the treatment of egg products, including the destruction of deleterious pathogenic organisms such as salmonella and other bacteria, and to the storing of such egg products as is common in connection with the preservation and delayed use thereof.

In order to protect public health, the U.S.D.A. and F.D.A. have long regulated the processing of various food products. Regulation has naturally been dependent upon knowledge of conditions affecting the various food products. While the existence of salmonella organisms in eggs and poultry has been recognized for many years, it has only been recently that regulations requiring a salmonellae negative product have been in effect. These regulations have resulted from the increased commercial use of liquid frozen and dried egg products and the recognition that the destruction or reduction to low level of other forms of bacteria is not an adequate safeguard to the public.

The production of a salmonella negative product by heat treatment, alone, has heretofore required exposing egg product to a temperature and for a time which substantially altered the natural condition, including cooking or coagulating at least a fractional part, especially the albumen, unless the product has prior to pasteurization been treated or stabilized. Various methods of stabilization have included the use of additives for pH adjustment such as lactic acid.

The use of stabilizing materials not only affects the physical nature of the product but may have other effects. For example, iron salts used to stabilize conalbumin may cause accelerated growth rate among any organisms that survive the heating process.

The patent to Jones et al., 3,113,872, describes the use of an homogenizer used prior to the product entering the heater sections of the pasteurizer in order to finely disperse the product and avoid coagulation. Subsequent to pasteurization brief exposure to vacuum and elevated temperature is employed for the purpose of removing objectionable odors and flavors. Jones et al. also state that egg whites are heated to 128° F., bypassing the homogenizer, and further heated for six seconds in a steam infuser. However, such further heating occurs after the product has passed the holding section and the diversion valve of the pasteurizer.

Another approach is described in the patent to Lloyd et al., 2,776,214, in which it is stated that pasteurization may be carried out without exceeding 130 F. through the addition of hydrogen peroxide to the product.

Coagulation is a progressive change depending on temperature and time, and occurs at a lower temperature for whites than for whole eggs or yolks. For whites the coagulation point is between 134.6 and 135° F. Whole eggs coagulate at between 147 and 148° F. Yolks have been heated to 158° F. but coagulation begins at 149° F. The foregoing apply to commercial processes in which 3½ minutes is the standard holding time.

The U.S.D.A. regulations effective Jan. 1, 1967 (7 CFR Part 55), state:

"55.101 Pasteurization of liquid eggs

"(a) *Pasteurizing facilities.*—Adequate pasteurizing equipment of approved construction shall be provided so that all of the liquid egg will be processed as provided in paragraph (b) of this section. The pasteurizing equipment shall be provided with a holding tube, an automatic flow diversion valve with attached thermal controls, and recording devices which will control the flow of egg liquid in such a manner as will accomplish pasteurization as set forth in paragraph (b) of this section and will record temperatures of the heated egg liquid at the flow diversion valve continuously and automatically during the process. * * *

"(b) *Pasteurizing operations.*—Strained and filtered liquid whole egg shall be flash heated to not less than 140° F. and held at this temperature for not less than 3½ minutes. All other egg products shall be flash heated to such temperatures and held for such times as will give equivalent effects and result in a salmonellae negative product. The flow diversion valve shall be adjusted so that all liquid not meeting the temperature requirements shall be diverted to a receiving tank. * * *

"(c) *Other acceptable methods.*—Other methods of pasteurization may be approved by the national supervisor upon receipt of satisfactory evidence that such methods will result in a salmonella negative product."

On May 9, 1966, the Poultry Division, Consumer and Marketing Service, U.S.D.A. Memorandum H-6, approved applicants' procedure as follows:

Another method of treating liquid albumen at less than 140° F. has been accepted as meeting the definition of pasteurization.

"Briefly the procedure is as follows:

"Liquid albumen is pumped through the regenerating section of a pasteurizer. It then enters a vacuum chamber set at no less than 17 inches. It is then pumped through the heating section and product temperature raised to no less than 134° F. and held at that temperature in holding tubes for no less than 3½ minutes.

"An alternative method is to vacuum treat the liquid albumen between the balance tank and regenerating section of the pasteurizer.

"The flow diversion valve shall be set so that all liquid not at 134° F. after the 3½ minute holding period is diverted.

"Albumen that has not been subjected to at least 17 inches of vacuum must be diverted.

"This procedure has been developed by the Ballas Egg Products Corp., Zanesville, Ohio. Firms interested in using this procedure should contact this firm."

As indicated above, one of the problems is meeting the regulations is in preventing coagulation of the egg product due to the requirements for pasteurization.

Various treatments have altered the physical nature of the product in an undesirable manner. Through the practice of the present invention, however, egg products may be pasteurized in accordance with U.S.D.A. regulations, without such treatment and without coagulation or cook-on of the product during pasteurization.

The present invention is applicable to the various egg products in that it provides for the effective uniform heating of the entire body of product thereby avoiding localized over-heating which may result in coagulation. Egg whites are especially susceptible to localized over-heating as they are more prone to entrain air or other gases and to froth. In accordance with the present invention, substantial quantity of air and other gases is removed by the application of a vacuum to the product. Removal of such air reduces air pockets with their attendent insulating effect, and avoids exposure of thermally isolated or localized portions to over-heating while other portions are inadequately heated. This permits more effective pasteurization at lower temperature and reduces the likelihood of coagulation at a given temperature.

Accordingly, it is an object of the invention to provide process and apparatus for the pasteurizaiton of egg and other products which is especially adapted for the efficient and effective carrying out of such pasteurization without altering the physical characteristics of the product.

Another object is to provide method and apparatus for the pasteurization of stabilized egg product which is effective to produce a salmonellae negative product and to insure that such product is not contaminated by unpasteurized product in a regenerator section.

A further object is to provide process and apparatus adapted to apply heat effectively and evenly to a product in order to avoid localized over-heating and in order to avoid the necessity for use of higher temperature in order to accomplish such heat treatment.

A further object is to provide pasteurizing apparatus for heat treatment of air-entrapping liquid product and having provision for application of vacuum prior to elevated temperature heat treatment in order to remove a substantial portion of the air and theerby permit more effective and even heating of the product, and having provision for increasing the pressure on the product after it is heated in order to prevent the intake of unpasteurized material.

Figure 2:
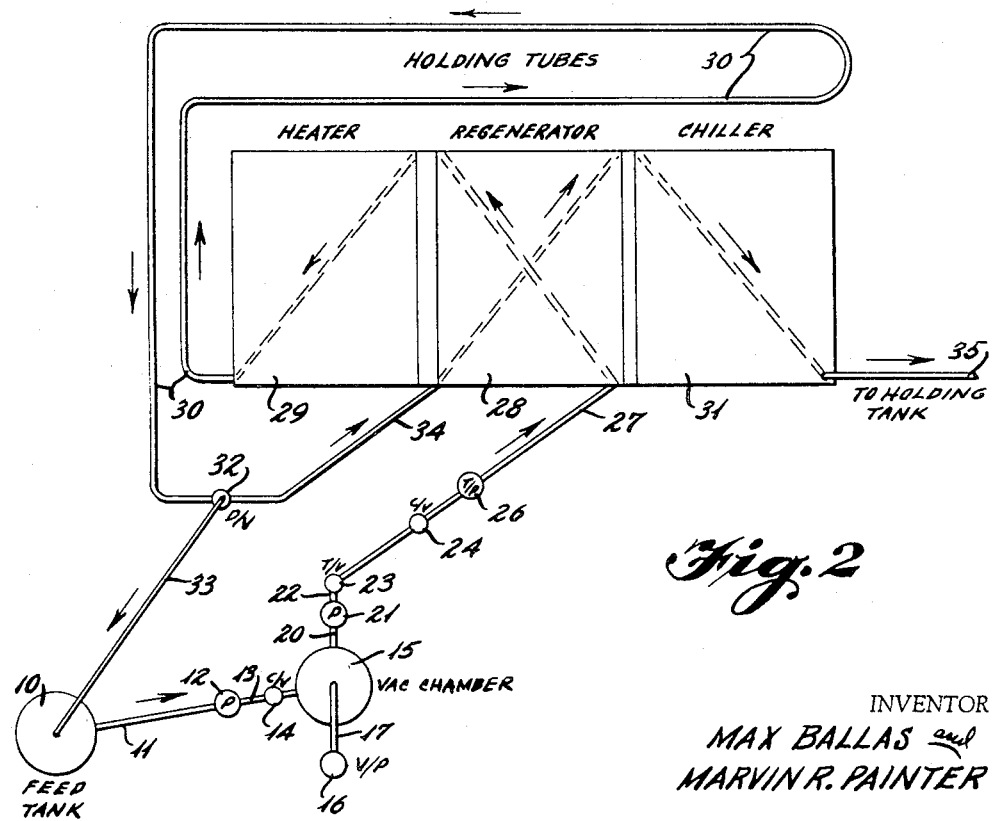

These and other objects of the invention will become apparent from the following description in conjunction with the accompanying drawings wherein:

FIG. 1 is a layout of an air removal and pasteurizing system in accordance with the present invention;

FIG. 2, another layout of the same system;

FIG. 3, a layout of a modified system with the sealed vacuum chamber in the system following the first heating step; and FIG. 4, another layout of the system of FIG. 3.

Briefly stated the invention is an apparatus and process for the pasteurization or heat treatment of egg and other products to kill deleterious, pathogenic organisms such as salmonella and others and includes removal of excess air and gas which would tend to insulate and interfere with complete pasteurization as well as possibly cause undesirable characteristics. The invention also includes the subjecting of the egg whites or other egg or other products to heat, and the combination and use of elements in the apparatus in a manner to produce the desired result. The apparatus includes means for maintaining a liquid level in the vacuum chamber, for removing liquid against the operation of the vacuum, the controlling of the liquid removal from the vacuum chamber, the arrangement of the heating and cooling units for heat exchange of maximum efficiency, as well as the maintenance of the product at the desired temperature for a sufficient length of time during the process.

The invention also includes, in cases where a regenerator having separate stages for bringing low temperature unpasteurized eggs into heat exchange relation with high temperature pasteurized eggs, and in which the eggs are subjected to a vacuum, the step of raising the pressure of the eggs after they leave the unpasteurized stage of the regenerator and before they return to the pasteurized stage so that egg flow will be from the pasteurized stage to the unpasteurized stage in the event of plate or gasket failure. This reduces the risk of contamination of pasteurized eggs.

In the practice of the invention there is provided an apparatus or system which includes a feed or supply tank 10 for containing the egg whites or egg or other products to be pasteurized, heated, or otherwise treated. This tank preferably is of stainless steel or it may be of plastic or of any other desired character, it being necessary that the entire apparatus or system have interior surfaces inert to bacteria. In this tank the egg whites or egg or other products to be treated are introduced at a temperature of approximately 40° F., or other U.S.D.A. approved operating temperatures.

The product is drawn from tank 10 through a discharge line 11 by means of a pump 12 and is discharged through a line 13 for treatment, such line being provided with a check valve 14 permitting flow in only one direction. The apparatus or system of the present invention may include a sealed vacuum chamber 15, the upper portion of which may connect with the line 13 of the first system, or the vacuum chamber may be located further along in the system after a preliminary heating step, it being the purpose of the invention to apply a vacuum at any location before the necessary temperature is effected. The chamber 15 is reduced to a substantial vacuum, approximately seventeen inches of mercury having been found satisfactory for egg whites, while for whole eggs between fifteen and sixteen, and for yolks as low as twelve inches. It has been found that in the process of pasteurization much useless and inefficient work is performed when air and gases are present in the liquid egg or other product, while on the other hand is pasteurization or subjecting to heat in the absence of air and gases, most efficient work can be accomplished and at a lower temperature.

Referring to the first apparatus or system of FIGS. 1 and 2, a vacuum pump 16 is connected by a line 17 with the upper end of the vacuum chamber 15 which, preferably, is an elongated cylinder with its axis upright, means being provided for maintaining a liquid level 18 within the lower end of such chamber by suitable means which may include a float 19 or other desired means.

Liquid egg or other products are removed through a line 20 from the vacuum chamber by means of a removal pump 21 and liquid from said pump is discharged through a line 22. A throttle or volume control valve 23 and a check valve 24 may be employed in a line 25 extending to a positive action timing pump 26. From this timing pump a discharge line 27 extends into a heating area, for example, a regenerating or preheating unit 28 which, with a heater 29, holding tube 30, and chiller 31, constitute the principal elements of the pasteurizer.

Liquid egg or other product discharged by the timing pump pass into the preliminary heating stage 28a of regenerator 28 at approximately 40° F., substantially the temperature of the liquid in the feed or supply tank, where such liquid is subjected to heat to raise its temperature from 40° to approximately 104° F. The liquid at this elevated temperature passes through an opening into the main portion of the heater 29 where its temperature is elevated to approximately 130° F. Liquid at 130° F. will be retained in a holding tube 30 or other area for approximately 3½ minutes to effect killing of the salmonella or other undesirable bacteria. While this treatment has been found to be adequate for pasteurization of egg whites, the use of other temperatures and holding time may be employed to meet U.S.D.A. regulations.

After its retention in the holding tube the liquid passes through a temperature responsive flow diversion valve 32 where any liquid below the 130° F. temperature is returned through a line 33 to the feed or supply tank 10, while liquid at the 130° F. temperature is returned through a line 34 to the higher temperature stage 28b of regenerator 28 where it comes into heat exchange relation with liquid entering the lower temperature stage 28a. This reduces the 130° F. temperature to near 104° F., after which the liquid flows through a passage into the chiller 31 where the temperature is further reduced to a temperature of approximately 38° F. (according to U.S.D.A. regulations) prior to its discharge from the cooling unit 31 through line 35.

Instead of the liquid from the supply or feed tank being discharged directly into the vacuum chamber 15, it may pass directly into the regenerator 28 as illustrated in FIG. 4; from the preliminary heater or regenerator the liquid flows through line 13 and check valve 14 to the vacuum chamber 15. Thereafter liquid may be forced from the vacuum chamber through the line 20 by means of the removal pump 21 or other means from whence it can pass through line 22, throttle valve 23 and check valve 24 when used, and line 25 to the timing or variable drive pump 26 if desired and then through a line 27 to the heater 29. Heater 29 may be a conventional plate heater in which plates separate the product from a heating fluid such as steam or water and serve as a normally fluid-tight heat-exchange barrier. From the heater 29 the liquid flows into holding tube 30 then to the flow diversion valve 32 with liquid below the desired temperature passing directly through line 33 to the feed or supply tank and liquid at the proper temperature passing through line 34 and then into the preliminary heating area or regenerator 28 and then through a direct connection into the chiller 31 and be discharged therefrom through line 35.

Pump 21 preferably is designed and adjusted to raise the pressure of the egg product to a sufficiently high level so that notwithstanding pressure losses as the eggs pass through heater 29 and holding tubes 30, the pressure in the high temperature stage 28b of regenerator 28 exceeds the pressure in the low temperature stage 28a. This insures that in the event of leakage between the stages that the product will flow from the pasteurized stage to the unpasteurized stage thus avoiding the danger of contamination of pasteurized product.

TESTING OF EGG SAMPLES

In order to determine the effect of the process on the bacteriological properties of the eggs, egg whites were processed under varying conditions. As a control, one batch was processed without previous contamination except by such bacteria as naturally occurred in the eggs. Two batches were processed after contamination with known quantities of salmonella organisms to determine effectiveness of the process. Another batch, uncontaminated, was processed under different conditions in order to determine at what point in the process bacteria were killed. Three other batches were processed under varying conditions in order to learn the lowest temperature at which an effective bacteria kill could be obtained.

All eggs were freshly broken, and came from the same lot. All were chilled to 40° F. before testing started. Each batch consisted of 2200 lbs. of egg whites, which were placed in the holding tanks. All were processed under a vacuum of seventeen inches applied under the conditions indicated.

Various samples were taken during the processes as hereafter described. Each sample was tested for the presence or absence of salmonella and of the amount of bacterial present in standard samples. Analysis of the eggs were based on the Standard Plate Count and Coliform Count in accordance with the Standard Methods for the Examination of Dairy Products, 11th edition, American Public Health Association, pp. 47–82, 1960. Tests for detection of Salmonella and Most Probable Numbers were in accordance with W. R. North, Jr., A Lactose Pre-Enrichment Method for Isolation of Salmonella From Dried Egg Albumen, Appl. Microbiol. 9: 188–195, 1961.

I. Results of processing uncontaminated batch

The first batch of egg whites was processed with the vacuum applied to the chilled egg whites before they had been heated in the regenerator and with the apparatus arranged as in FIGS. 1 and 2. The egg whites were treated at varying temperatures and rates of flow. With the particular apparatus used, a rate of flow (R/F) of 3000 lbs./hr. held the product in the holding tubes for 3½ minutes. The test data is set forth in Table 1.

TABLE 1

| Description | Samonella Isolation | Total Count | Coliform Count |
|---|---|---|---|
| Sample, prior to heat treatment | Neg. | 300,000 | ¹ TNC |
| Heat treated 136° F. R/F 3,000 lbs./hr. | Neg. | 6,400 | 10 |
| Heat treated 136° F. R/F 2,600 lbs./hr. | Neg. | 6,800 | 10 |
| Heat treated 142° F. Heat 132° F. Hold R/F 2,500 lbs./hr. | Neg. | 6,300 | 10 |

¹ TNC = Too numerous to count.

The conclusion drawn was that heat treatment at 136° F. for 3½ minutes gave a satisfactory kill. Treatment for a longer period of time, or at a higher temperature than 136° F. did not substantially improve bacteria kill. Coagulation of egg whites was not a problem even when the product was held in the tubes for more than 3½ minutes or was heated to 142° F.

II. Salmonella contaminated eggs processed with vacuum applied before regeneration The eggs within the second 2200 lbs. holding tank were contaminated with a mixed culture of approximately equal amounts of broth suspensions of *Salmonella cerro*, *Salmonella montevideo* and *Salmonella oranienburg* isolated from other raw egg material. The broth suspensions were incubated for 24 hours at 35° C. in tripticase soy broth (Difco). The three broth cultures were mixed and added to four liters of sterile distilled water for better dispersion throughout the eggs. The total number of salmonnella organisms contaminating the whites was considered to far surpass that number which might naturally infect this quantity of eggs. The eggs and the cultures were agitated for two hours, and the eggs were then treated in accordance with the apparatus disclosed in FIGS. 1 and 2, that is with the eggs being subjected to a vacuum while chilled, and before preliminary heating in the regenerator. The test data is set forth in Table 2.

TABLE 2

| Description | Samonella Isolation | Total Count | Coliform Count |
|---|---|---|---|
| Sample, prior to heat treatment | Pos. | 300,000 | ¹ TNC |
| Heat treated 140° F. Heat 136° F. Hold. | Neg. | 880 | 10 |
| Heat treated 141° F. Heat 132° F. Hold. | Neg. | 780 | 10 |
| Sample, prior to heat treatment | Pos. | 300,000 | ¹ TNC |
| Heat treated 137° F. Heat 136° F. Hold. | Neg. | 650 | 10 |
| Sample, prior to heat treatment | Pos. | 300,000 | ¹ TNC |
| Heat treated 163° F. Hold 137° F. Heat. | Neg. | 1,000 | 10 |
| Sample, prior to heat treatment | Pos. | 300,000 | ¹ TNC |
| Heat treated 135° F. Hold 135° F. Heat. | Neg. | 1,000 | 10 |

¹ TNC = Too numerous to count.

Despite strong contamination, the heat treatment above 135° F. killed the salmonella and reduced other bacteria to insignificant levels. Heat treatment at temperatures as high as 141° F. gave no significantly improved results.

III. Processing with vacuum applied after eggs preheated in regenerator

After completion of the previous test, the apparatus was disinfected, rinsed, disassembled and rearranged with the vacuum chamber placed after the regenerator as illustrated in FIGS. 3 and 4. A raw sample was contaminated with a mixed batch of salmonella organisms prepared as described above. Further samples of the egg whites were taken after contamination but before heat treatment, during the process, and with varying temperatures of heat treatment. Results of testing these samples for bacteria are set out below in Table 3.

TABLE 3

| Description | Samonella Isolation | Total Count | Coliform Count |
|---|---|---|---|
| Uncontaminated control, Raw Tripolyphosphate Triacetin (additives to improve whipping qualities). | Neg. | 300,000 | TNC |
| Uncontamined control, Raw | Neg. | 300,000 | TNC |
| Heat treated 136° F. Hold R/F 2,880 lbs./hr. | Neg. | 1,000 | 10 |
| Heat treated 136° F. Hold R/F 3,060 lbs./hr. | Neg. | 1,000 | 10 |
| Heat treated 135° F. Hold R/F 3,880 lbs./hr. | Neg. | 1,000 | 10 |
| Heat treated 134° F. Hold R/F 2,820 lbs./hr. | Neg. | 1,000 | 10 |
| Sample, raw, mid-tank | Pos. | 300,000 | TNC |
| Heat treated 134° F. Hold R/F 2,820 lbs./hr. | Neg. | 1,000 | 10 |
| Heat treated 133° F. Hold R/F 2,820 lbs./hr. | Neg. | 1,000 | 10 |

[1] TNC=Too numerous to count.

IV. Location at which bacteria are killed

In order to determine at what point bacteria are killed in the system of FIGS. 3 and 4, in which the eggs are subjected to a vacuum after preheating to 104° F. in the regenerator, a series of petcocks were attached to the apparatus at various locations. A fourth 2200 lb. lot of egg whites was processed without any preliminary inoculation with salmonella organisms. The eggs were heated to 133° F. and five samples, designated 1 to 5 below, were taken at the points indicated. Thereafter the eggs were heated to a temperature of 135° F. and four samples designated below as samples 6–9 were taken at the points indicated. During this heating process, the eggs were maintained in the holding tubes at the indicated temperature for 3½ minutes. The results are tabulated in Table 4.

TABLE 4

| Number | Description | Samonella Isolation | Total Count | Coliform Count |
|---|---|---|---|---|
| 1 | Control, Raw | Neg. | 300,000 | [1] TNC |
| 2 | After regeneration (104° F.) Before vacuum chamber | Pos. | 300,000 | TNC |
| 3 | After regeneration and vacuum treatment | Neg. | 300,000 | TNC |
| 4 | After heat treatment at F/D valve | Neg. | 1,000 | 10 |
| 5 | Final product (chilled) | Neg. | { 3,000 (1,400) } | 10 |
| 6 | After regeneration (104° F.) Before vacuum chamber | Neg. | 300,000 | TNC |
| 7 | After regeneration and vacuum treatment | Neg. | 300,000 | TNC |
| 8 | After heat treatment at F/D valve | Neg. | { 3,000 2,100 } | 10 |
| 9 | Final product (chilled) | Neg. | { 3,000 (1,300) } | 10 |

[1] TNC=Too numerous to count.

It will be noted that the bacteria were reduced to insignificant levels after heat treatment, but that the bacteria level was still high after regenerative heating and vacuum treatment. Particularly interesting is that a naturally occurring *Salmonella infantis* contamination was found in sample 2. However, no salmonella was found in the samples taken after heat treatment. It was gratifying to note that naturally occurring salmonella were apparently killed in the same fashion as artifically introduced salmonella.

V. Effect of lower heating temperatures on uncontaminated egg whites

Samples of egg whites which were not artificially contaminated were treated at temperatures of 130° F., 129° F. and 133° F. The results of the sample of this test are set out below in Table 5.

TABLE 5

| Description | Salmonella Isolation | Total Count, per cc. | Coliform Count, per cc. |
|---|---|---|---|
| Raw-whites | Neg. | 300,000 | [1] TNC |
| After past. 130° F. Heat R/F 3,000 lbs./hr. | Neg. | 3,000 | 10 |
| After past. 130° F. Heat R/F 2,640 lbs./hr. | Neg. | 3,000 | 10 |
| After past. 130° F. Heat R/F 2,640 lbs./hr. | Neg. | 3,000 | 10 |
| After past. 129° F. Heat R/F 2,640 lbs./hr. | Neg. | 3,000 | 10 |
| Raw-whites | Neg. | 300,000 | TNC |
| After past. 133° F. Heat R/F 2,640 lbs./hr. | Neg. | 3,000 | 10 |
| After past. 133° F. Heat R/F 2,640 lbs./hr. | Neg. | 3,000 | 10 |
| After past. 133° F. Heat R/F 2,640 lbs./hr. | Neg. | 1,000 | 10 |

[1] TNC=Too numerous to count.

It will be noted that no salmonella was discovered and that the bacteria counts were reduced to insignificant levels even at these lower temperatures. However, the bacterial kill was not quite as effective as with heat treatments at some higher temperatures.

VI. Heat treatment of salmonella contaminated egg whites at lower temperatures Each of two 2200 lb. tanks of raw egg whites was contaminated with 24-hour broth suspensions of *Salmonella montevideo, Salmonella cerro* and *Salmonella oranienburg* prepared and mixed as before. Results of this processing as set out below in Table 6.

TABLE 6

| Description | Salmonella Isolation | Total Count | Coliform Count |
|---|---|---|---|
| Tank 1 Raw before contamination | Neg. | 300,000 | [1] TNC |
| Tank 2 Raw before contamination | Neg. | 300,000 | TNC |
| Raw Tank 1 after contamination | { [2] [3] } | 300,000 | TNC |
| Past. heat 131° F. R/F 3,180 lbs./hr | Neg. | 3,000 | 10 |
| Past. heat 131° F. R/F 3,180 lbs./hr | Neg. | 3,000 | 10 |
| Raw Tank 2 after contanimation | { [2] [3] } | 300,000 | TNC |
| Past. heat 130.5° F. R/F 3,480 lbs./hr | Neg. | 3,000 | 10 |
| Past. heat 133° F. R/F 3,480 lbs./hr | Neg. | 3,000 | 10 |
| Past. heat 132° F. R/F 2,760 lbs./hr | Neg. | 102,000 | 10 |
| In flow diversion | Neg. | 3,000 | 10 |
| Past. heat 132° F. R/F 2,880 lbs./hr | Neg. | 1,000 | 10 |

[1] TNC=Too numerous to count.
[2] *Sal. cerro.*
[3] *Sal. montevideo.*

It will be noted that the salmonella tests were negative and that the bacteria levels were reduced to insignificant levels after heat treatment at temperatures of above 130.5° F.

VII. Heat treatment of salmonella contaminated egg whites at 127° F.

It was next decided to further reduce heat temperatures in order to learn the maximum temperature at which salmonella could survive heat treatment after the egg whites had been subjected to a vacuum. A broth suspension of the three salmonella organisms was prepared as previously indicated. The heat treating temperature was set at 127° F., and the flow diversion valve was set to divert egg whites at a temperature of 126° F. and below. Results of this test are below in Table 7.

TABLE 7

| Description | Salmonella Isolation | MPN [1] | Total Count, per cc. | Coliform Count, per cc. |
|---|---|---|---|---|
| Raw, Uncontaminated | Neg. | Neg. | 300,000 | [2] TNC |
| Raw, Contaminated | Sal. cerro, Sal. oranienburg | 11.00 | 300,000 | TNC |
| After Past. 127° F. Heat 3,000 lbs./hr | Sal. cerro, Sal. oranienburg | 11.00 | 51,000 | 700 |
| After Past. 127° F. Heat 3,000 lbs./hr | Sal. cerro, Sal. oranienburg, Sal. montevideo | 11.00 | 21,000 | 220 |
| Raw Mid-Tank | Sal. cerro, Sal. oranienburg | 11.00 | 300,000 | TNC |
| After Past. 127° F. Heat 3,000 lbs./hr | Sal. oranienburg | 11.00 | 12,000 | 70 |
| Past. 127° F. Heat 3,000 lbs./hr | Sal. oranienburg | 11.00 | 16,000 | 240 |
| Raw | Sal. cerro, Sal. oranienburg | 11.00 | 300,000 | TNC |

[1] MPN=Most Probable Numbers.
[2] TNC=Too Numerous to Count.

This temperature was not satisfactory to kill salmonella. Previous tests showed salmonella kill in contaminated egg whites by heat treatment at 130.5° F. Other previous tests (Table 5, sample 5) showed bacteria counts at insignificant levels after heat treatment at 129° F. with uncontaminated samples. It would appear that in this process eggs, after having been subjected to a vacuum, should be heat treated to a temperature of at least 129° F. and no higher than the eggs' coagulating temperature.

EFFECT OF VACUUM ON COAGULATION

Apparatus was arranged first substantially as shown in FIGS. 3 and 4, with egg product passing from the low temperature stage of regenerator 28 to heater 29, but with line 13 on the discharge side of the regenerator 28a connected directly to line 25, bypassing the vacuum chamber 15. Thereafter, the apparatus was connected with the vacuum chamber 15 in the line. In each case, an effort was made to keep the eggs within the holding tubes 30 for 3½ minutes with the temperature at 135° F.

In the test run with the vacuum tank bypassed, the temperature of eggs in the pasteurizer gradually dropped from 135° F. to 133° F. over a period of 65 minutes. Then the eggs were automatically diverted by diversion valve 32 back to the feed tank as a result of the temperature drop. Heater 29 was opened and a substantial deposit of coagulated egg whites were found on the plates. The conclusion drawn was that as a result of continued exposure to a temperature of 135° F., a small portion of the eggs continuously coagulated cutting down heat flow through the heater. As a result of this coagulation, heat transfer to the remaining liquid egg whites gradually dropped to the point where the pasteurization temperature could not be maintained.

After the same apparatus was cleaned, the test was run with the eggs subjected to vacuum before heating. The eggs remained at a substantially steady temperature (within less than 1.0° F. of 135.0° F.) for five hours and fifty minutes. The test was then discontinued because it was felt that it had been established that coagulation was markedly reduced when the eggs were subjected to a vacuum. The plates were opened. Only a very slight amount of coagulation could be observed and that in only small areas of the plates. The conclusion drawn was that the tests could have been continued for a very much greater period of time without objectionable coagulation.

HEAT TREATMENT OF WHOLE EGGS

Whole eggs were contaminated with salmonella organisms in the same fashion as were the whites and were pasteurized according to the method of FIGS. 3 and 4 in which the eggs are subjected to vacuum after preheating in the regenerator and before pasteurization. The eggs were subjected to approximately seventeen to twenty inches of vacuum. Five test runs were made at each temperature. Results of this test are shown below in Table 8.

TABLE 8

| Temperature | Salmonella | Standard Plate Count | Coliform Count, per cc. |
|---|---|---|---|
| Before Past. | Pos. | 7,000,000 | 1,100,000. |
| 134° F. | Pos. 4 runs, neg. 1 run. | 29,200 to 38,000 | 560 to 730. |
| 136° F. | Pos. 1 run, neg. 4 runs. | 11,400 to 25,000 | 290 to 440. |
| 138° F. | Neg. | 14,500 to 27,600 | 60 to 330. |
| 140° F. | Neg. | 15,100 to 21,600 | 50 to 190. |
| 142.5° F. | Neg. | 7,700 to 15,500 | Below 10 to 60. |
| 144° F. | Neg. | 7,000 to 11,800 | Below 10 to 10. |
| 146° F. | Neg. | 5,800 to 8,700 | Below 10. |
| 148° F. | Neg. | 4,800 to 9,100 | Do. |

In a further check, the test was repeated. Salmonella determinations were made, but Standard Plate Counts and Coliform Counts were not made. Five test runs were made at each temperature. Results appear in Table 9.

TABLE 9

| Temperature | Salmonella | MPN [1] |
|---|---|---|
| Before Past. | Pos. | Greater than 11,000/gm. |
| 136° F. | All 5 runs pos. | 92 to 160/gm. |
| 138° F. | 1 run pos.; 4 runs neg. | Less than 3.0/gm. for pos. |
| 140° F. | Neg. | |
| 142° F. | Neg. | |
| 144° F. | Neg. | |
| 146° F. | Neg. | |
| 148° F. | Neg. | |
| 150° F. | Neg. | |

[1] Most Probable Number.

An additional test was run under the same conditions. Testing of these whole eggs before contamination revealed that the eggs had a natural salmonella contamination of less than .03 per gram. The eggs were then artifically contaminated as before to raise the salmonella level to 11,000 per gram. Ten test runs were conducted at each of the following temperatures: 136° F., 138° F., 140° F. and 142.5° F. In none of these 40 runs was salmonella contamination found after pasteurization. This not only confirmed results of previous tests but showed that temperatures as low as 136° F. are often effective to kill salmonella.

The conclusion is that when this method is practiced, effective salmonella kills of whole eggs can be obtained by heating the eggs to a temperature of 140° F., and that a kill is usually obtained if the whole egg is heated to 138° F.

It will be apparent from the foregoing that apparatus and a process are provided for the treatment of egg products at a low temperature to maintain essential physical properties and at the same time to effectively destroy salmonella and other undesirable organisms. By means of the apparatus and process described air and other gases are removed which permits destruction of organisms at a low temperature without cook-on or coagulation and without the necessity for altering the pH value or the use of stabilization additives.

It will also be apparent from the foregoing that various changes in the invention may be made without departing from the spirit and scope thereof, and therefore the invention is not limited to the embodiments illustrated and described but only as indicated in the accompanying claims.

What is claimed is:

1. The process of treating egg whites to destroy certain deleterious pathogenic organisms including salmonella, which process comprises the steps of: treating the egg whites with triacetin and hexametaphosphate to improve the whipping qualities thereof, subjecting said egg whites to vacuum to remove the major portion of the trapped air from the same to allow easier and more complete heat treatment of the same to kill certain deleterious pathogenic organisms, preheating the egg whites to elevate the temperature approximately to 104° F., further heating the egg whites to raise the temperature from approximately 104° F. to 130° F., maintaining said 130° F. temperature for approximately 3½ minutes while the product is free of trapped air, and then cooling the treated product by heat exchange with a cooler portion of the product an amount corresponding to the amount of rise in temperature of the preheated step.

2. The process of treating egg whites to destroy certain deleterious pathogenic organisms including salmonella, which process comprises the steps of: preheating the egg whites to elevate the temperature to approximately 104° F., subjecting the egg whites to vacuum to remove the major portion of the air trapped therein, further heating said egg whites to raise the temperature from approximately 104° F. to approximately 130° F. to destroy certain deleterious pathogenic organisms, maintaining said 130° F. temperature for approximately 3½ minutes while the product is free of trapped air, and then cooling the treated egg whites by heat exchange with a cooler portion of the egg whites an amount corresponding to the amount of rise in temperature of the preheating step.

3. The process of treating egg products to destroy certain deleterious pathtogenic organisms including salmonella, which process comprises the steps of: preheating the products to raise the temperature to approximately 104° F., subjecting the products to vacuum to remove air therefrom, further heating the products to a temperature of approximately 130° F. for a predetermined period of time while the product is free of trapped air until substantially all of said deleterious organisms are killed, and then by heat exchange with a cooler portion of the products an amount corresponding to the amount of rise in temperature of the preheating step.

4. The process of treating egg products to destroy at least certain deleterious pathogenic organisms including salmonella, which process comprises the steps of: preheating the products, subjecting the products to vacuum to remove the major portion of the trapped air from the egg products to allow easier and more complete treatment of the same, heating the products to a further elevated temperature of approximately 130° F., maintaining said products at said further elevated temperature for a predetermined period of time while the product is free of trapped air for the substantially complete destruction of said organisms, and thereafter cooling the products.

5. The method of pasteurizing raw liquid egg product comprising regeneratively heating the raw product at a temperature below that required for pasteurization through heat exchange with product preceding it which has been heated to and maintained at pasteurizing temperature for a predetermined minimum length of time, subjecting the regeneratively heated product to vacuum while it is at a temperature not in excess of 142° F. in order to remove excess air and other gases which tend to insulate and to interfere with pasteurization, thereby reducing its tendency to coagulate at pasteurizing temperature, heating the product in which the excess air and gas have been removed to a temperature high enough for pasteurization but below that at which substantial coagulation occurs, substantially holding the product at such temperature for a predetermined minimum length of time, diverting any product which has not been held at pasteurizing temperature for such length of time, and regeneratively cooling undiverted product by passing it in heat exchange relation with said raw product.

6. The method of claim 5, and increasing the product pressure after it is subjected to vacuum such that the pressure of the product being regeneratively heated is below that of the product with which it is in heat exchange relation in the regenerator.

7. The method of claim 5 in which the product is egg whites, the product is regeneratively heated to approximately 104° F., the pasteurizing temperature is approximately 134° F., the time approximately 3½ minutes, and the vacuum approximately seventeen inches of mercury.

8. The method of claim 5 in which the product is whole egg, the product is regeneratively heated to approximately 115° F., the pasteurizing temperature is approximately 138° F., the time approximately 3½ minutes, and the vacuum approximtaely fifteen inches of mercury.

9. Apparatus for treating egg products comprising the combination of a feed tank for the reception of the product to be treated at a predetermined temperature, an air removal tank, a first line leading from the feed tank to the air removal tank, a pump in said first line for transferring matter from the feed tank to the air removal tank, a check valve in said first line, suction means for removing air from the upper part of the air removal tank, a second line extending from the lower portion of the air removal tank, a pump for producing flow of liquid from said air removal tank through said second line, a throttle valve controlling the flow through said second line, means for controlling the flow through said second line, a heating system including heating, regenerating and cooling units, a third line from said timing pump extending to said regenerating unit, a connection between said regenerating unit and said heating unit, a holding tube connected to said heating unit, a flow diversion valve connected to the discharge end of said holding tube, a fourth line extending from said diversion valve into said regenerating unit, a connection between said regenerating unit and said cooling unit, and a discharge line from said cooling unit.

10. Apparatus for treating egg products to destroy certain deleterious pathogenic organisms comprising a feed tank for the reception of egg products to be treated, means for introducing egg products into said feed tank, a preheating unit for heating the egg products, a first line providing communication between said feed tank and said preheating unit, first pump means disposed along said first line between said feed tank and said preheater for causing flow through said first line, and air removal tank connected to said preheating unit by a second line, vacuum pump means for removing air from the egg products within said air removal tank, a third line connected to said air removal tank, second pump means for discharging the egg products from said air removal tank through said third line, a heater unit receiving the egg products from said third line and adapted to further heat the same to a temperature of approximately 130° F., a holding tube extending from said heater unit for holding the egg products at approximately 130° F. for 3½ minutes, a fourth line connecting said holding tube to said preheating unit so that the treated egg products will be in heat exchange relation with untreated egg products to cool the treated products and preheat the untreated products, and a cooling unit having a connection with said preheating unit and adapted to receive treated egg products therefrom for cooling the same, whereby untreated egg products will be preheated, subjected to a partial vacuum to remove most of the air therefrom, and thereafter further heated to a temperature to destroy at least certain pathogenic organisms.

11. Apparatus for pasteurizing liquid egg product comprising a regenerator having a first section for preheating the product prior to pasteurization in heat exchange with a second section for cooling the product after pasteurization, a pasteurizing heater connected to the first section of the regenerator such that the preheated product is discharged from said first section of the regenerator to said pasteurizing heater whereby the temperature of said product is raised in the pasteurizing heater from that attained in the first section of the regenerator to the temperature required for pasteurization a temperature holding means connected to said pasteurizing heater whereby the temperature is held to that required for pasteurization for a predetermined minimum time, product diverting means connected to the temperature holding means and operable to divert product whose temperature has not been at least at the required minimum for a predetermined minimum time, and means located prior to said pasteurizing heater for subjecting the product to a partial vacuum in order to remove excess air and other gases which tend to insulate and to interfere with pasteurization in said heater.

12. The apparatus of claim 11, and means intermediate the vacuum means and the regenerator second section for increasing the pressure of the product in the regenerator second section above that in the regenerator first section in order to avoid leakage of the unpasteurized product into the pasteurized product in the event of inadvertent leakage between the regenerator sections.

13. The apparatus of claim 11, means for diverting the product after such holding back to the regenerator first section, and means responsive to the temperature of the product after such holding for operating the diverting means in the event that such temperature is below the predetermined temperature.

14. The apparatus of claim 11, means for diverting the product after such holding back to the regenerator first section, and means responsive to the vacuum means for operating the diverting means in the event that the vacuum is below a predetermined level.

15. The process of treating liquid egg product to destroy certain deleterious pathogenic organisms including salmonella, which includes the step of preheating the egg product to a temperature less than 128° F., subjecting the egg product to vacuum to remove air therefrom, and furthere heating the egg product to raise the temperature from approximately 130° F. to approximately not more than 142° F. for a period of time sufficient to kill said deleterious pathogenic organisms while the egg product is substantially free of trapped air.

16. The method of claim 15, in which the vacuum is from about 15 to 17 inches of mercury.

References Cited

UNITED STATES PATENTS

| | | | |
|---|---|---|---|
| 1,592,048 | 7/1926 | Shepheard | 99—215 |
| 3,054,684 | 9/1962 | Smith | 99—216 |
| 3,113,872 | 12/1963 | Jones et al. | 99—161 |

LIONEL M. SHAPIRO, *Primary Examiner.*